US012604056B1

(12) United States Patent
Horowitz et al.

(10) Patent No.: US 12,604,056 B1
(45) Date of Patent: Apr. 14, 2026

(54) LIVE MEDIA STICKER STREAMING

(71) Applicant: Meta Platforms, Inc., Menlo Park, CA (US)

(72) Inventors: Michael Sheppard Horowitz, New York, NY (US); Byung Il Kang, Great Neck, NY (US); Maclyn Brandwein, Long Island City, NY (US); Yurong Jiang, Santa Clara, CA (US); Vladimir Shubin, Bellevue, WA (US); Chen Yang, Jersey City, NJ (US); Eddy Wang, Jersey City, NJ (US); Robert Spychala, New York, NY (US); Siddhartha Roychowdhury, Fremont, CA (US); Gabriel Ochoa, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 230 days.

(21) Appl. No.: 18/354,997

(22) Filed: Jul. 19, 2023

Related U.S. Application Data

(60) Provisional application No. 63/378,244, filed on Oct. 4, 2022.

(51) Int. Cl.
*H04N 21/431* (2011.01)
*H04N 21/2187* (2011.01)
*H04N 21/81* (2011.01)

(52) U.S. Cl.
CPC ..... *H04N 21/4316* (2013.01); *H04N 21/2187* (2013.01); *H04N 21/8146* (2013.01)

(58) Field of Classification Search
CPC ........... H04N 21/4316; H04N 21/2187; H04N 21/8146
See application file for complete search history.

(56) References Cited

U.S. PATENT DOCUMENTS

| | | | |
|---|---|---|---|
| 9,571,900 B2 * | 2/2017 | Slothouber | .......... H04N 21/812 |
| 10,863,230 B1 * | 12/2020 | Pham | ................. H04N 21/6547 |
| 2018/0234708 A1 * | 8/2018 | Chong | ................. H04N 21/472 |
| 2019/0111346 A1 * | 4/2019 | Payzer | .............. H04N 21/4788 |
| 2019/0261025 A1 * | 8/2019 | Hussain | ........... H04N 21/25891 |
| 2020/0128284 A1 * | 4/2020 | Parks | .................. H04N 21/858 |
| 2022/0239988 A1 * | 7/2022 | Yang | ................. H04N 21/4725 |

* cited by examiner

*Primary Examiner* — Nicholas T Corbo
(74) *Attorney, Agent, or Firm* — EVERSHEDS SUTHERLAND (US) LLP

(57) ABSTRACT

The disclosed systems and methods may include (1) receiving, from a broadcaster-user of a live video stream, a selection of (i) an interactive digital sticker and (ii) a position for the interactive digital sticker within an active stream frame of the live video stream, (2) in response to receiving the selections, rendering non-interactive image data, corresponding to a non-interactive component of the interactive digital sticker, on top of the active stream frame at the selected position, and (3) as part of transmitting the live video stream to a device of a viewer of the live video stream, (i) transmitting, to the viewer's device, the active stream frame with the non-interactive image data and (ii) delivering to the viewer's device, at the active stream frame, interactive digital sticker data corresponding to an interactive component of the interactive digital sticker. Various other methods, systems, and computer-readable media are also disclosed.

18 Claims, 11 Drawing Sheets

100

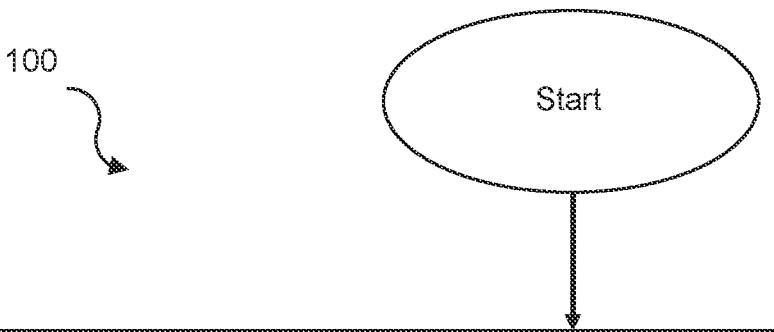

Start

Receiving, from a broadcaster-user of a live video stream, a selection of (1) an interactive digital sticker and (2) a position for the interactive digital sticker within an active stream frame of the live video stream
110

In response to receiving the selections, rendering non-interactive image data, corresponding to a non-interactive component of the interactive digital sticker, on top of the active stream frame at the selected position
120

As part of transmitting the live video stream to a device of a viewer of the live video stream, (1) transmitting, to the viewer's device, the active stream frame with the non-interactive image data and (2) delivering to the viewer's device, at the active stream frame, interactive digital sticker data corresponding to an interactive component of the interactive digital sticker
130

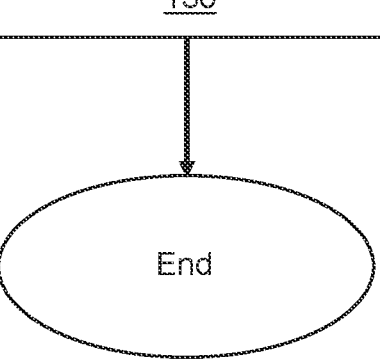

End

LIVE MEDIA STICKER STREAMING

CROSS-REFERENCE TO RELATED APPLICATIONS

This application claims the benefit of priority to U.S. Provisional Application No. 63/378,244, which was filed 4 Oct. 2022. The contents of this provisional application is also incorporated herein by reference in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method for live media sticker streaming.

Figure 2:
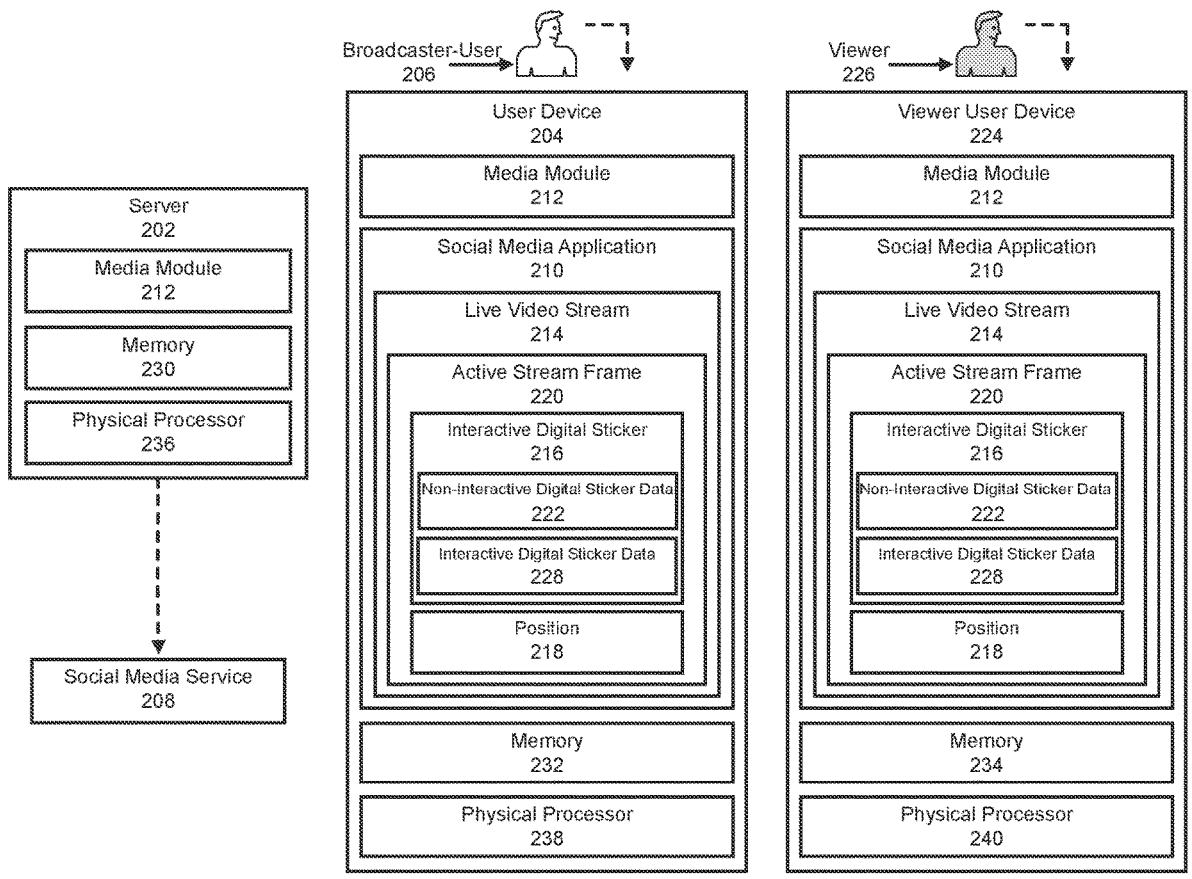
FIG. 2 is a block diagram of an exemplary system for live media sticker streaming.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to a streaming framework for streaming interactive stickers (e.g., graphics) within a live media stream. In some examples, the streaming framework may enable a broadcaster (e.g., a user broadcasting a live video stream) to (1) select an interactive digital sticker (e.g., from a tray of selectable stickers) and (2) select a position, size, and/or rotation for the selected interactive digital sticker within an active stream frame (e.g., a broadcast frame) of the broadcaster's live video stream (e.g., enabling a user placement selection, scaling selection, and rotation selection for the digital sticker within the active stream frame). In response, a broadcasting device (e.g., a server and/or a device of the broadcaster) may render non-interactive image data, corresponding to a non-interactive version (e.g., component) of the digital sticker, on top of the active stream frame at the position selected by the broadcaster. The broadcasting device may then transmit the rendered active stream frame (that includes the non-interactive image data) to a viewer's device, as part of transmitting the live video stream to the viewer's device. In addition to transmitting the active stream frame with the non-interactive image data, the broadcasting device may deliver to the viewer's device, at the active stream frame (e.g., via a signaling channel attached to the active stream frame), a message that includes interactive digital sticker data corresponding to an interactive version (e.g., component) of the digital sticker. In these examples, the non-interactive version of the interactive digital sticker may be overlayed onto the active stream frame by the broadcasting device and the interactive version of the interactive digital sticker may be overlayed onto the active stream frame by the viewer's device.

By providing both a non-interactive version of an interactive digital sticker and an interactive version of the sticker, the disclosed framework may enable (1) viewer devices that support interactive digital sticker data to present the interactive version of the sticker while at the same time enabling (2) viewer devices that do not support interactive digital sticker data (e.g., inline video players) to present the non-interactive version of the sticker. Additionally, the disclosed framework may enable different states (e.g., visually distinctive versions) of an interactive sticker to be sent to different viewer devices (e.g., based on user data and/or a categorization of a user of a viewer device). For example, a "Follow Me" version of a follow sticker, which may enable a viewer to follow a broadcaster, may be sent to the device of a viewer who is not following the broadcaster while a "Following" version of the follow sticker, which informs a viewer that the viewer is following the broadcaster and/or which enables the viewer to unfollow the broadcaster, may be sent to the device of a viewer who is following the broadcaster. As another specific example, a first language (e.g., English) version of a sticker with text may be sent to the device of a viewer designated as a speaker of the first language while a second language (e.g., Spanish) version of the sticker with text may be sent to the device of a viewer designated as a speaker of the second language.

The disclosed message with the interactive digital sticker data, delivered by the broadcasting device to the viewer's device, may be configured to work within a live streaming framework (e.g., without disrupting the flow of a stream) in a variety of ways. In some embodiments, certain data relevant to rendering the interactive version of the digital sticker (e.g., data relating to sticker style type) may intentionally not be included within the message. In these embodiments, the message may include an identifier for the digital sticker, which may be used by the viewer's device to query the broadcasting device for the omitted data. By including an identifier, which may be used to query for full data (e.g., the omitted data) relating to the interactive digital sticker, the disclosed framework may send messages with active stream frames that are under a threshold size (e.g., a size that does not disrupt the stability of a live video stream). In addition to sending an identifier to query for omitted digital sticker data, in some examples, a viewer's device may send viewer data designating a category that the viewer falls within. In these examples, the broadcasting device may, in response to receiving the identifier and the viewer category data, send a state (e.g., version) of the interactive sticker that corresponds to the designated viewer category.

As will be explained in greater detail below, embodiments of the present disclosure may improve the field of video streaming by expanding user interactivity (e.g., from a framework in which the only viewer interactivity is clicking an emoji and/or leaving a comment to a framework that enables viewers to interact with digital stickers). Additionally, embodiments of the present disclosure may improve the field of video streaming by enabling digital stickers to be transmitted to viewer devices in multiple states and/or by enabling interactive content to be sent to certain viewer devices (e.g., a device watching a live video stream) and non-interactive content to be sent to other viewer devices (e.g., a device watching a was-live video stream as part of a video on demand service). Embodiments of the present disclosure may improve a computer itself by improving the computer's streaming capabilities.

The following will provide, with reference to FIG. 1, detailed descriptions of computer-implemented methods for interactive digital stickers. Detailed descriptions of corresponding example systems will also be provided in connection with FIG. 2. Detailed descriptions of interfaces and embodiments corresponding to the disclosed methods and systems will be provided in connection with FIGS. 3-11.

FIG. 1 is a flow diagram of an exemplary computer-implemented method 100 relating to interactive digital stickers. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (associated with a broadcaster-user 206). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at social networking. The term "social networking" may refer to any type or form of digital communication that occurs between users of a social networking platform via an interface of the social networking platform. Examples of social networking may include, without limitation, text-based and/or image-based communication, video-based communication, audio-based communication, videoconferencing and/or audioconferencing, digital status broadcasting, private digital messaging, public content posting and/or commenting via a social media feed and/or a profile, etc. In some examples, server 202 may operate as part of and/or in connection with a social media platform 208. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user (e.g., broadcaster-user 206) of user device 204 may be a user (e.g., a member) of a social networking platform (e.g., social media platform 208). In these examples, user device 204 may have installed an instance of a social media application 210, which may operate as part of social media platform 208 and through which one or more services provided by social media platform 208 (e.g., via server 202) may be accessible. In some examples, social media application 210 may be dedicated to a single service. For example, social media application 210 may represent a dedicated newsfeed application or a dedicated stories application. In other examples, social media application 210 may provide access to multiple services (e.g., a combination of two or more of the social networking services described below). In addition, or as an alternative, to social media application 210, user device 204 may have installed a browser that may navigate to one or more webpages through which the one or more services provided by social media platform 208 (e.g., via server 202) may also be accessible.

In some examples, the user of user device 204 may represent a broadcaster-user (e.g., broadcaster-user 206) broadcasting a live video stream, generated from user device 204, to one or more additional devices (e.g., viewer user devices). In these examples, user device 204 may represent a broadcasting device configured to broadcast the live video stream to the additional devices and/or user device 204 may transmit the live video stream to server 202, which may serve as the broadcasting device configured to broadcast the live video stream to the additional devices.

In some examples, the steps shown in FIG. 1 may be performed (at least in part) by modules operating in an additional user device (e.g., a viewer device used by a viewer-user to view the live video stream generated via user device 204, as will be described in greater detail below in connection with step 130). In these examples, the additional user device may include any of the features described above in connection with user device 204 and may have installed an additional instance of social media application 210, which may operate as part of social media platform 208 and through which one or more services provided by social media platform 208 (e.g., via server 202) may be accessible.

As mentioned above, social media platform 208 may provide a variety of services (e.g., platforms and/or frameworks) for the users within its network (e.g., via server 202 and/or social media application 210). For example, social media platform 208 may provide a newsfeed service. The term "newsfeed" may generally refer to any type or form of social media consumption channel, provided via an interface, that presents a scrollable collection of newsfeed posts. In some examples, a newsfeed may scroll (e.g., upward or downward) to reveal the different posts within the newsfeed (e.g., in response to receiving user scrolling input). In one example, the scrollable collection may include newsfeed posts created by contacts of a particular user (e.g., friends of the particular user) and/or other users that the particular user is following (i.e., connected content). Additionally, the newsfeed may include non-connected content (e.g., content created by users who are not contacts of the particular user).

Figure 3:
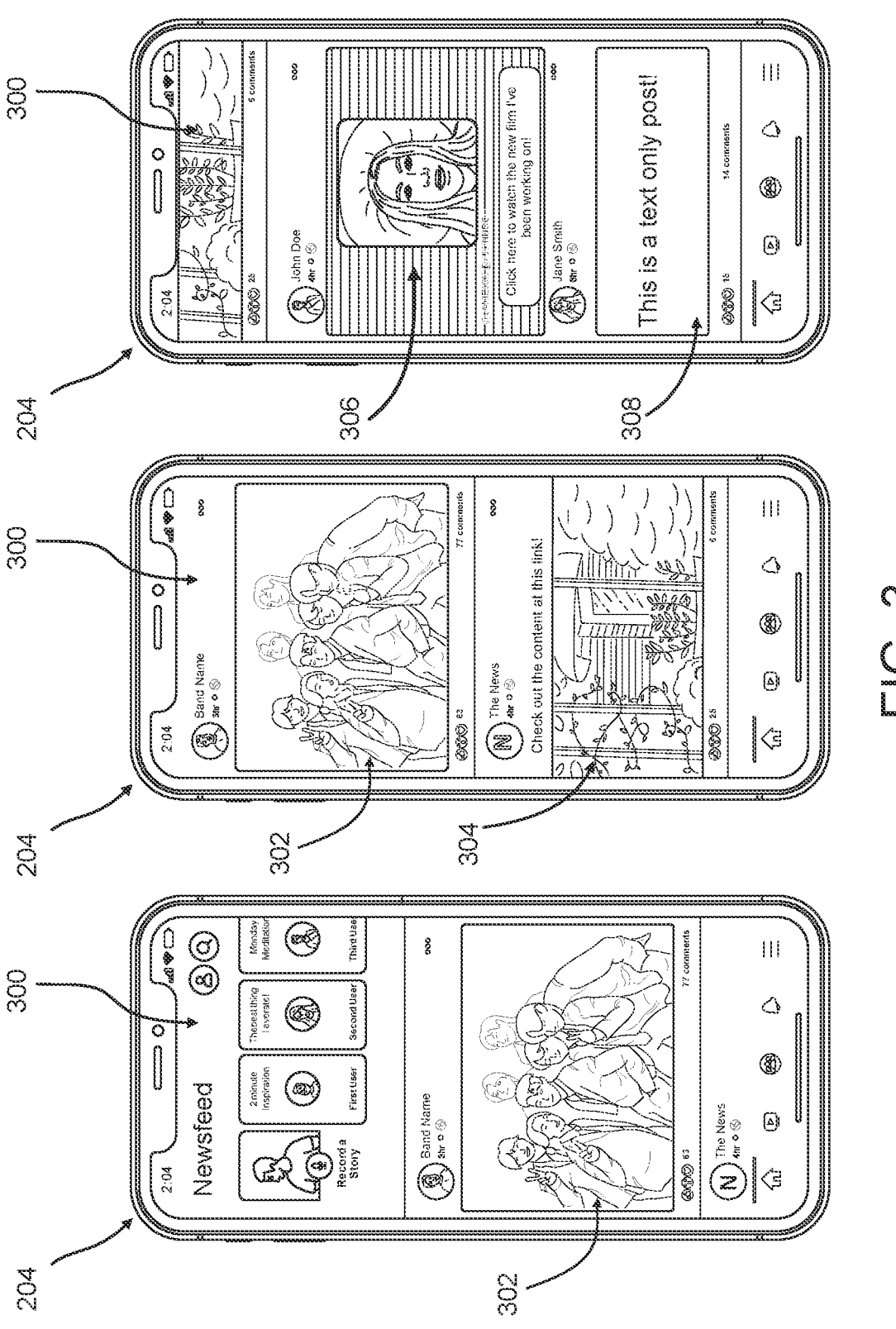
FIG. 3 is an illustration of an exemplary newsfeed interface.
Figure 10:
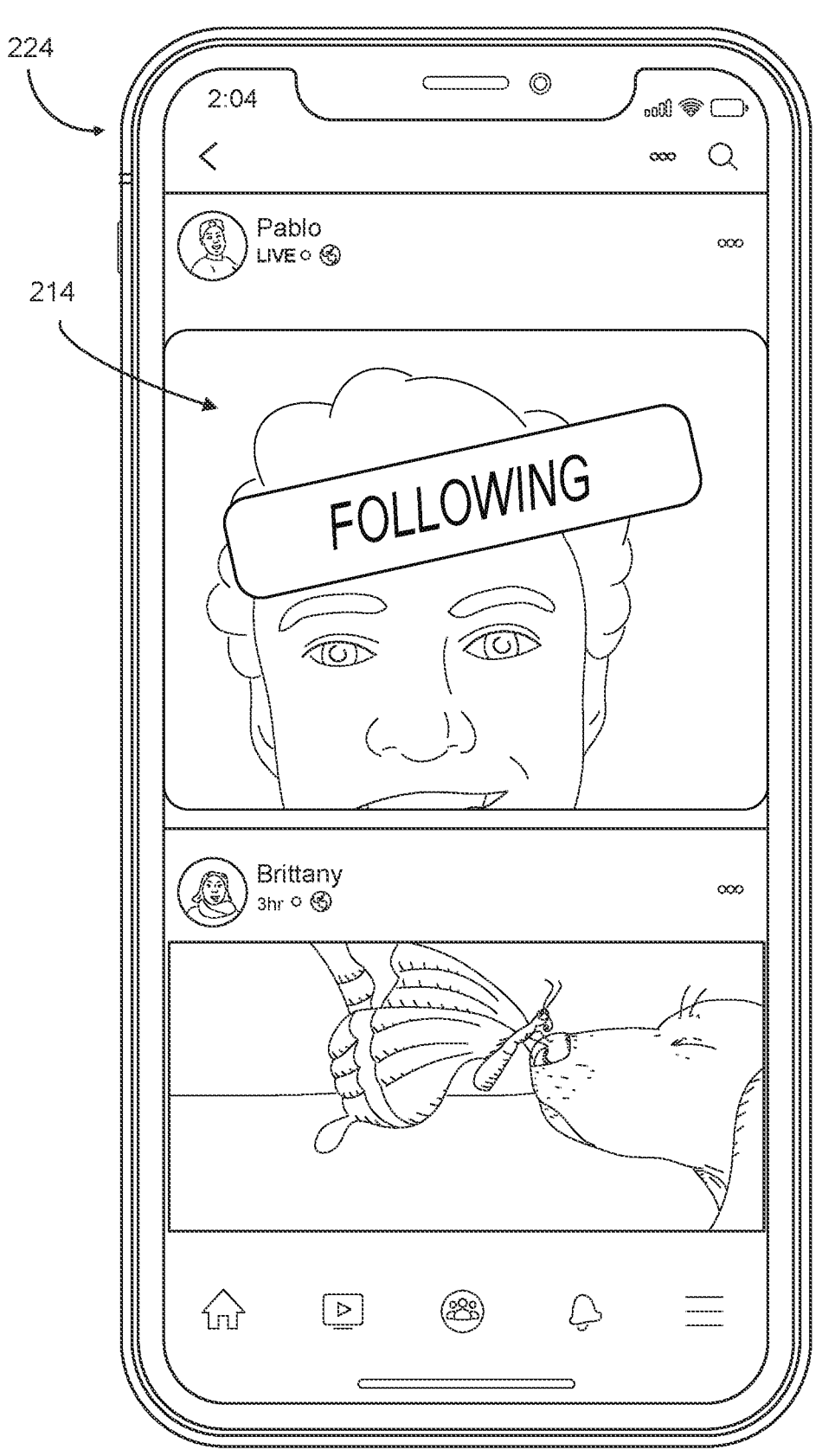
FIG. 10 is an illustration of an exemplary live media stream with an interactive digital sticker in a first sticker state.
Figure 11:
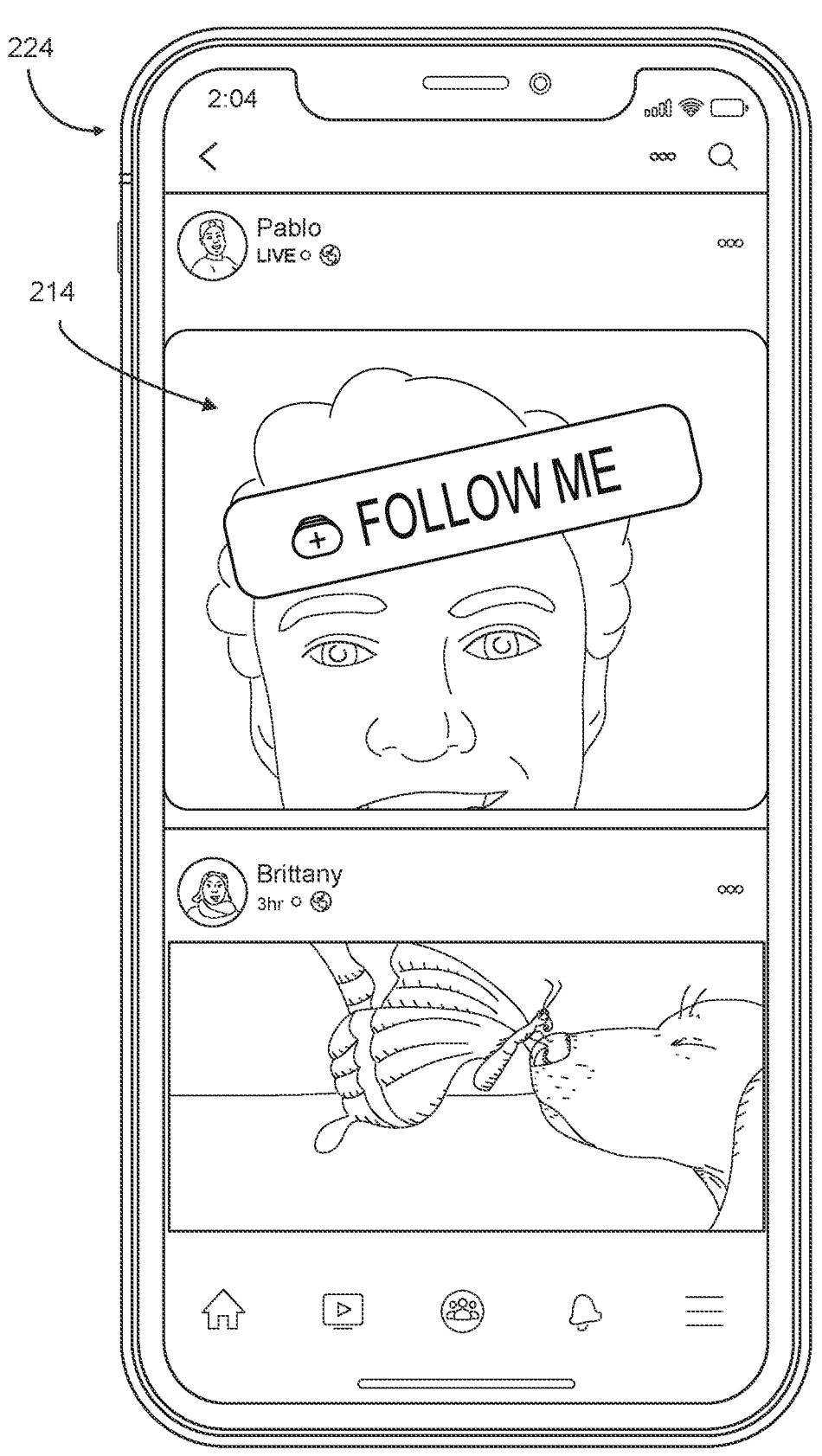
FIG. 11 is an illustration of an exemplary live media stream with an interactive digital sticker in a second sticker state.

The term "newsfeed post" generally refers to any type or form of digital composition that may be displayed in a newsfeed. Newsfeed posts may include a variety of content. For example, a newsfeed post may include, without limitation, text, an image, a video, a set of multiple images and/or videos, and/or a link (e.g., to a post, webpage, article, film, etc.). FIG. 3 depicts an exemplary newsfeed interface 300 with a newsfeed that includes an image-based newsfeed post 302, a link-based newsfeed post 304, a video-based newsfeed post 306, and a text-based newsfeed post 308. FIGS. 10-11 provide additional exemplary depictions of newsfeed interfaces.

In some examples, a newsfeed post may include a viewing pane for the content of the newsfeed post (e.g., the text in a text-based post, the image in an image-based post, etc.). A newsfeed post may also display a text-based caption, metadata content (e.g., content describing users that have been tagged in the newsfeed post, a timestamp, etc.), information indicating the source of the newsfeed post (e.g., the name of the creator of the post, a profile image, etc.), and/or a digital special effect (e.g., a digital sticker, a filter, an-augmented reality element, etc.). Such information and/or features may be displayed (and/or a menu corresponding to such information and/or features may be displayed) within the viewing pane (e.g., over the primary content), within the viewing pane and/or may be visually associated with the viewing pane (e.g., displayed beneath the viewing pane).

The newsfeed service may enable viewers of a newsfeed post to digitally respond to the newsfeed post in a variety of ways. In some examples, a newsfeed interface may enable a user to comment on a newsfeed post (e.g., via a text, image, and/or video-based reply) and may create a digital thread of comments corresponding to the newsfeed post (e.g., displayed beneath the newsfeed post and/or accessible via a comments affordance).

In some examples, the newsfeed service may enable live video streaming. For example, the newsfeed service may enable a user to broadcast a live video stream as a newsfeed post and/or within an interface of the newsfeed service. In these examples, the live video streaming may utilize any of the features of the live video streaming framework discussed in this application (e.g., in steps 110-130 of FIG. 1).

As another example, social media platform 208 may provide a digital stories service. The digital stories service may provide users with a digital stories feed, which presents a continuous series of digital story posts to a story-consumer, one by one (e.g., in a slideshow format). The term "digital story post" may generally refer to any type or form of digital composition intended for a digital stories feed. A digital story post may include a variety of content (e.g., a digital photograph, a graphic, text, a digital video, an artificial reality element, a digital audio recording, etc.). In one example, the story consumption channel may transition from presenting one digital story post to the next automatically, without requiring any user input to do so. In some examples, digital story posts from the same source (e.g., created and/or posted by the same user) may be grouped together, such that each digital story post from a particular source is displayed prior to displaying digital story posts from another source.

Figure 4:
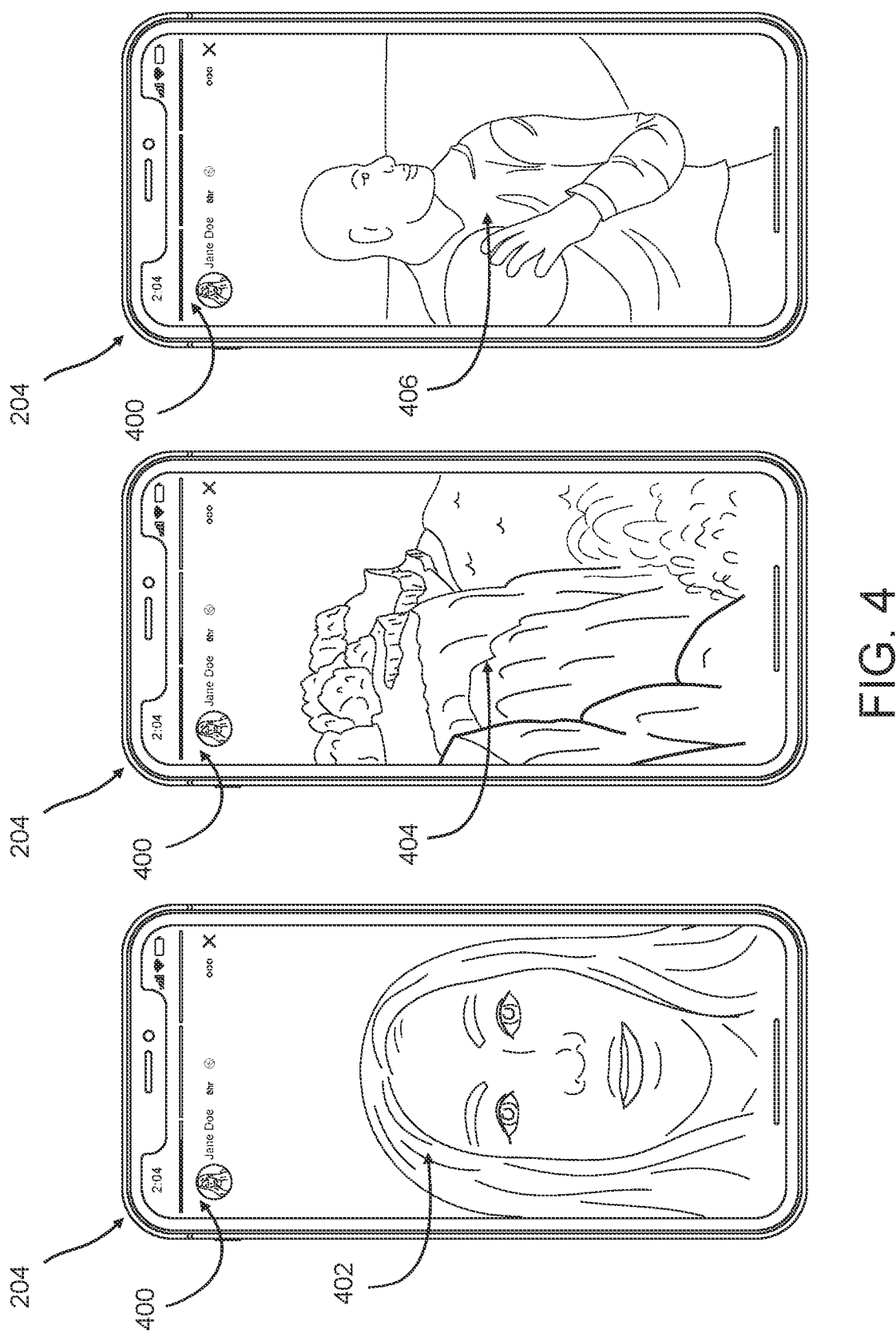
FIG. 4 is an illustration of an exemplary digital stories interface.

In one embodiment, a digital story post may be ephemeral. That is, the digital story post may only be viewable for a predetermined amount of time. For example, a digital story post may be set to disappear after twenty-four hours. Similar to the newsfeed service, the digital stories service may enable viewers of a story post to comment on the post, via a text and/or image-based reply and/or reply story, creating a digital thread of comments. Also similar to the newsfeed service, the digital stories service may configure a story feed for a particular user that includes connected content (e.g., story posts created by users who are contacts of the particular user or being followed by the particular user), non-connected content, or a determined ratio of connected content to non-connected content. FIG. 4 depicts an exemplary story interface 400 showing digital story posts 402, 404, and 406 of a user's digital story.

In some examples, the stories service may enable live video streaming. For example, the stories service may enable a user to broadcast a live video stream as a story post and/or within an interface of the stories service. In these examples, the live video streaming may utilize any of the features of the live video streaming framework discussed in this application (e.g., in steps 110-130 of FIG. 1).

In some examples, social media platform 208 may provide a short-form video service (e.g., a reels service) that enables users to create short-form videos and/or consume (e.g., watch and/or digitally respond to) short-form videos created by other users. In one embodiment, social media platform 208 may create a short-form video feed for each user of its short-form video service. The term "short-form video" may generally refer to a digital video configured for short-form video feed consumption. In some examples, a platform for creating and/or posting a short-form video may only enable the creation and/or posting of short-form videos that are a certain length and/or that are less than a certain length (e.g., less than thirty seconds in length).

The term "short-form video feed" may generally refer to a series (e.g., a queue) of digital short-form videos (e.g., selected for a particular user) that social media application 210 (or a corresponding webpage) is configured to play, one by one, as a continuous series (e.g., advancing from one short-form video to the next automatically). In some examples, a short-form video feed may be configured to play short-form videos asynchronously (e.g., to play a continuously evolving queue of pre-recorded short-form videos). In some examples, short-form videos may be continuously added to a user's short-form video feed as the short-form videos of the feed are consumed (e.g., such that a determined number of short-form videos are always in queue to be played).

Figure 5:
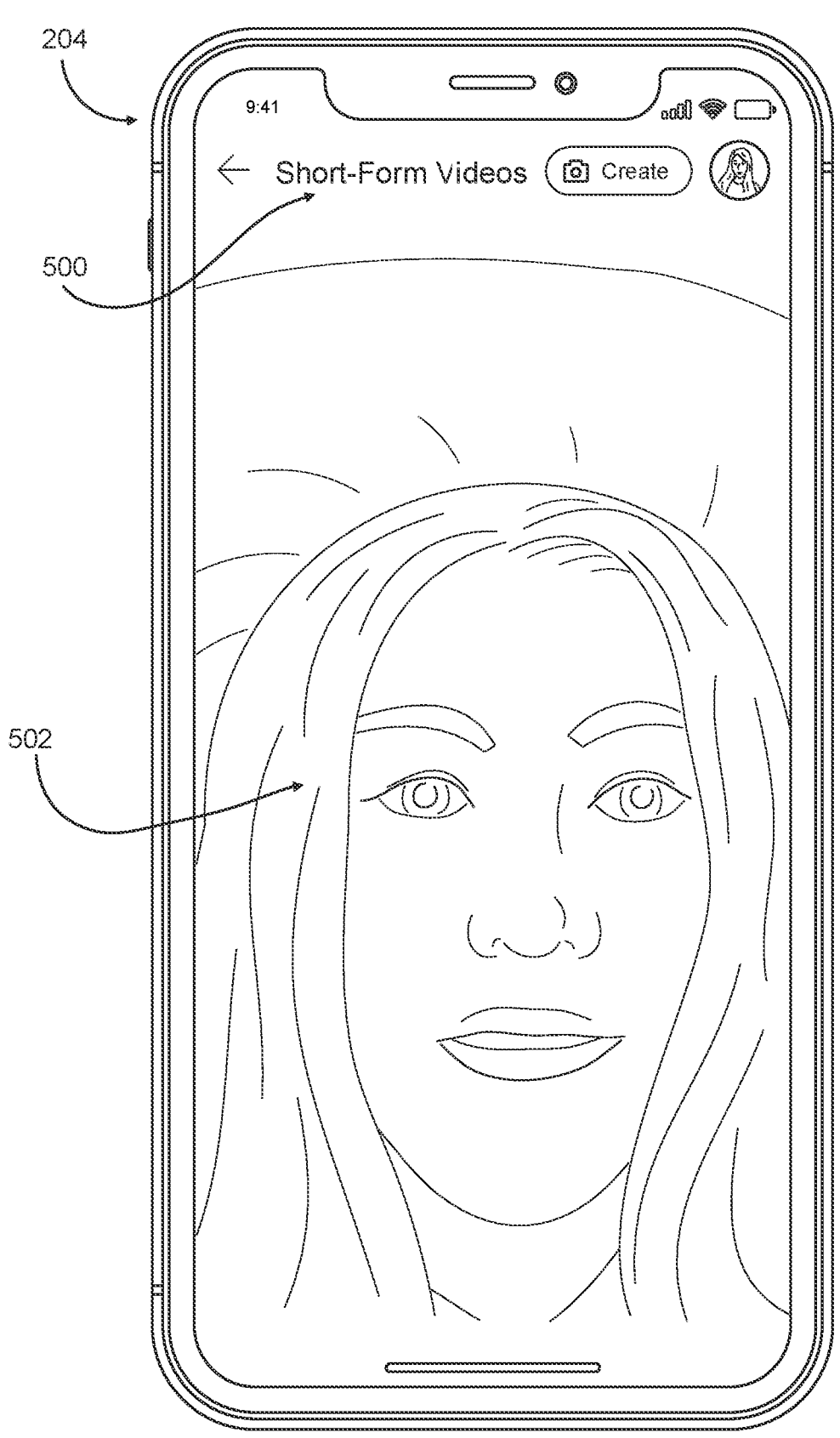
FIG. 5 is an illustration of an exemplary short-form video consumption interface.

In some examples, a short-form video feed may be presented via a dedicated short-form video feed interface. FIG. 5 depicts an exemplary dedicated short-form video feed interface 500 presenting a short-form video 502. Short-form videos may be selected for the short-form video feed of a particular user based on a variety of metrics. For example, a short-form video may be selected based on a topic the short-form video has been tagged with (e.g., in response to a determination that the particular user is interested in and/or predicted to be interested in the topic). As another example, a short-form video may be selected based on a user who created the short-form video (e.g., in response to a determination that the particular user is following the user and/or is predicted to be interested in content by the creator). As another example, a short-form video may be selected based on a popularity of the short-form video.

In some embodiments, a short-form video may be displayed (e.g., streamed) with a variety of information relating to the short-form video. Such information may include, for example, a name and/or profile element of an account that created the short-form video, a title of the short-form video, viewer responses to the short-form video and/or an affordance that navigates to viewer responses to the short-form video, one or more elements for providing a digital social response to the short-form video, a transcript of the short-form video, etc.

In some examples, the short-form video service may enable live video streaming. For example, the short-form video service may enable a user to broadcast a live video stream as a short-form video post and/or within an interface of the short-form video service. In these examples, the live video streaming may utilize any of the features of the live video streaming framework discussed in this application (e.g., in steps 110-130 of FIG. 1).

Figure 6:
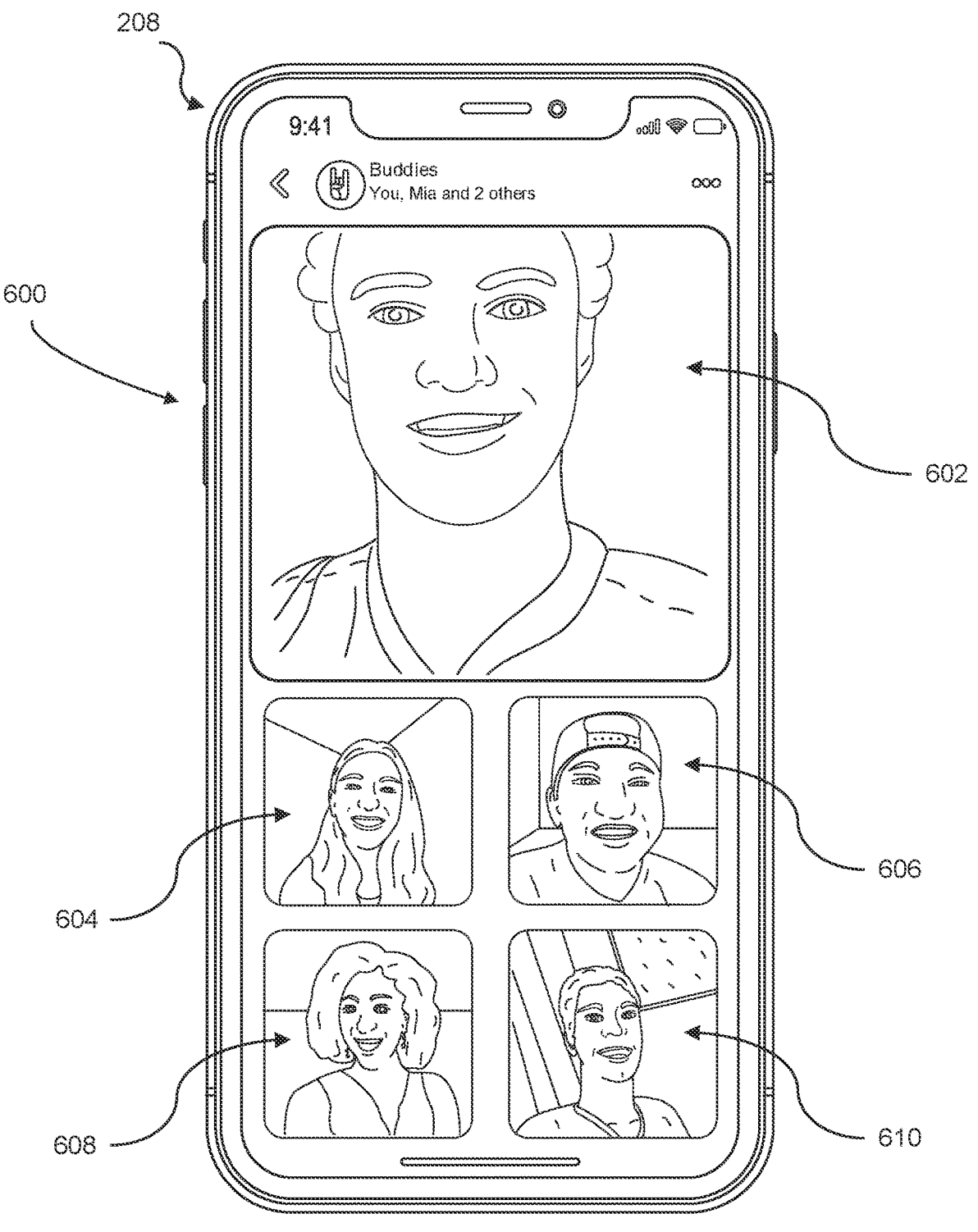
FIG. 6 is an illustration of an exemplary video conferencing interface.

As another example, social media platform 208 may provide a media conferencing (e.g., audioconferencing and/or videoconferencing) service (e.g., a "rooms" service) for hosting media calls (e.g., audio calls and/or video calls). The media conferencing service may operate as a stand-alone service and/or may be integrated with another service (e.g., a messaging service, a social workplace service, etc.). The term "media conferencing service" refers to any type or form of streaming and/or videotelephony service that enables the digital transmission and/or sharing of real-time media (e.g., video and/or audio) streams (e.g., from multiple endpoints) via a media conferencing interface. The term "real-time media stream" generally refers to any type or form of multimedia that is transmitted in real time (e.g., as a series of frames) from an endpoint (i.e., a transmitting device) to one or more additional endpoints. Audio and/or frames may be played and/or displayed by an endpoint (to a user) as the audio and/or frames are received. FIG. 6 depicts an exemplary videoconferencing interface 600 with video tiles 602, 604, 606, 608, and 610 (each presenting a video stream of a user).

In some examples, the media conferencing service may enable live video streaming. For example, the media conferencing service may enable a user to broadcast a live video stream within an interface of the media conferencing service (e.g., as a webinar hosted by the media conferencing service). In these examples, the live video streaming may utilize any of the features of the live video streaming framework discussed in this application (e.g., in steps 110-130 of FIG. 1).

Returning to FIG. 1, at step 110, one or more of the systems described herein may receive, from a broadcaster-user of a live video stream, a selection of (1) an interactive digital sticker and (2) a position for the interactive digital sticker within an active stream frame of the live video stream. For example, as illustrated in FIG. 2, a media module 212 may receive, from broadcaster-user 206 of a live video stream 214, a selection of (1) an interactive digital sticker 216 and (2) a position 218 for interactive digital sticker 216 within an active stream frame 220 of live video stream 214.

Interactive digital sticker 216 may generally represent any type or form of digital graphic configured to be presented within an active stream frame of a live video stream. Interactive digital sticker 216 may take any visual appearance (e.g., may take any shape and/or include any color). In some examples, interactive digital sticker 216 may represent a platform-provided graphic (e.g., selected by broadcaster-user 206 to apply to live video stream 214 in real-time). Interactive digital sticker 216 may include any content. As a specific example, interactive digital sticker 216 may represent a follow sticker (e.g., as illustrated in FIGS. 7-10). Other specific examples of interactive digital sticker 216 may include, without limitation, a location sticker, a user tag sticker, a like sticker, a feelings sticker, a birthday sticker, an animation, a poll sticker, a registration sticker, a time sticker, and/or an emoji.

In some examples, interactive digital sticker 216 may include a non-interactive component and an interactive component. The term "interactive component" may refer to a dynamic (e.g., changeable) component of interactive digital sticker 216. In some examples, the interactive component may include two or more sticker states, each of which may correspond to a different viewer category. Returning to the example (e.g., depicted in FIGS. 7-10) in which interactive digital sticker 216 represents a follow sticker, interactive digital sticker 216 may include a first sticker state, indicating that broadcaster-user 206 is being followed (e.g., by a viewer) and a second sticker state, indicating that broadcaster-user 206 is not being followed and/or including an invitation to follow broadcaster-user 206. The interactive component of interactive digital sticker 216 may be presented in a given sticker state (or may alternate from one sticker state to another) in response to a variety of triggers, as will be discussed later in connection with steps 120-130.

The term "non-interactive component" may refer to a component of interactive digital sticker 216 that is not configured to be interacted with (e.g., manipulated) via user input. In some examples, a "non-interactive component" of interactive digital sticker 216 may refer to a non-dynamic (e.g., non-changing and/or static) component of interactive digital sticker 216. In some examples, interactive digital sticker 216 may be interactive for a viewer (e.g., viewer 226 who will be discussed later) but non-interactive for broadcaster-user 206 (e.g., the non-interactive component but not the interactive component may be presented within a broadcaster view of live media stream 214). In some examples, the non-interactive component of interactive digital sticker 216 may be rendered by a broadcasting device (e.g., user device 204 and/or server 202) and the interactive component may be rendered by a viewer device (as will be discussed in greater detailed in connection with steps 120-130).

Media module 212 may receive the selections of interactive digital sticker 216 and position 218 in a variety of ways. In some examples, media module 212 may provide broadcaster-user 206 with a broadcasting interface that enables broadcaster-user 206 to record video for a broadcast, to broadcast the video to one or more viewers (e.g., as a live video stream), and/or to edit the video in real-time as the video is being broadcast (e.g., by adding interactive digital stickers to the video). In these examples, media module 212 may enable broadcaster-user 206 to select interactive digital sticker 216 and position 218 via the broadcasting interface.

Figure 7:
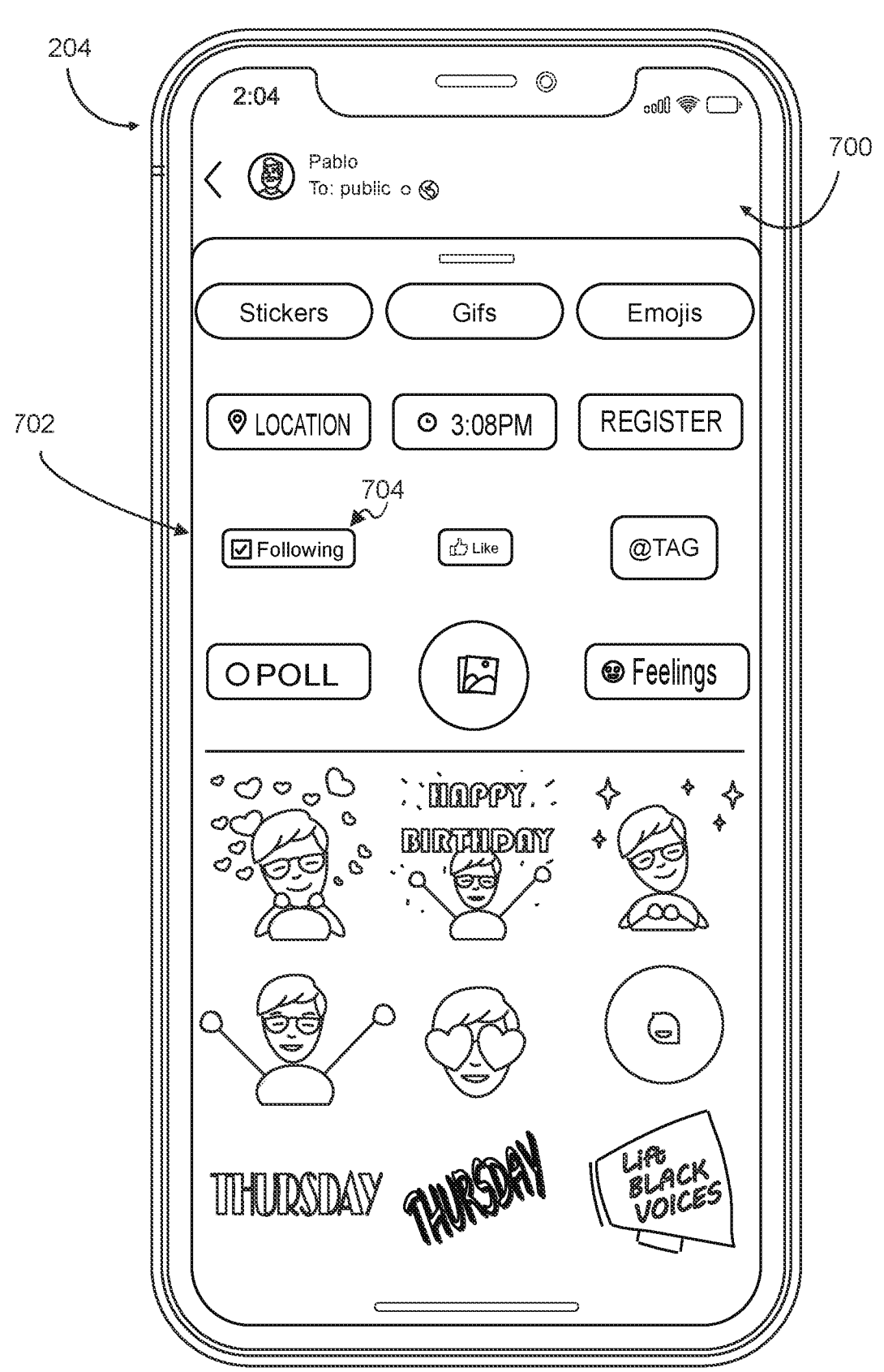
FIG. 7 is an illustration of an exemplary sticker tray presented to a broadcaster-user as part of a broadcast creation flow.
Figure 8:
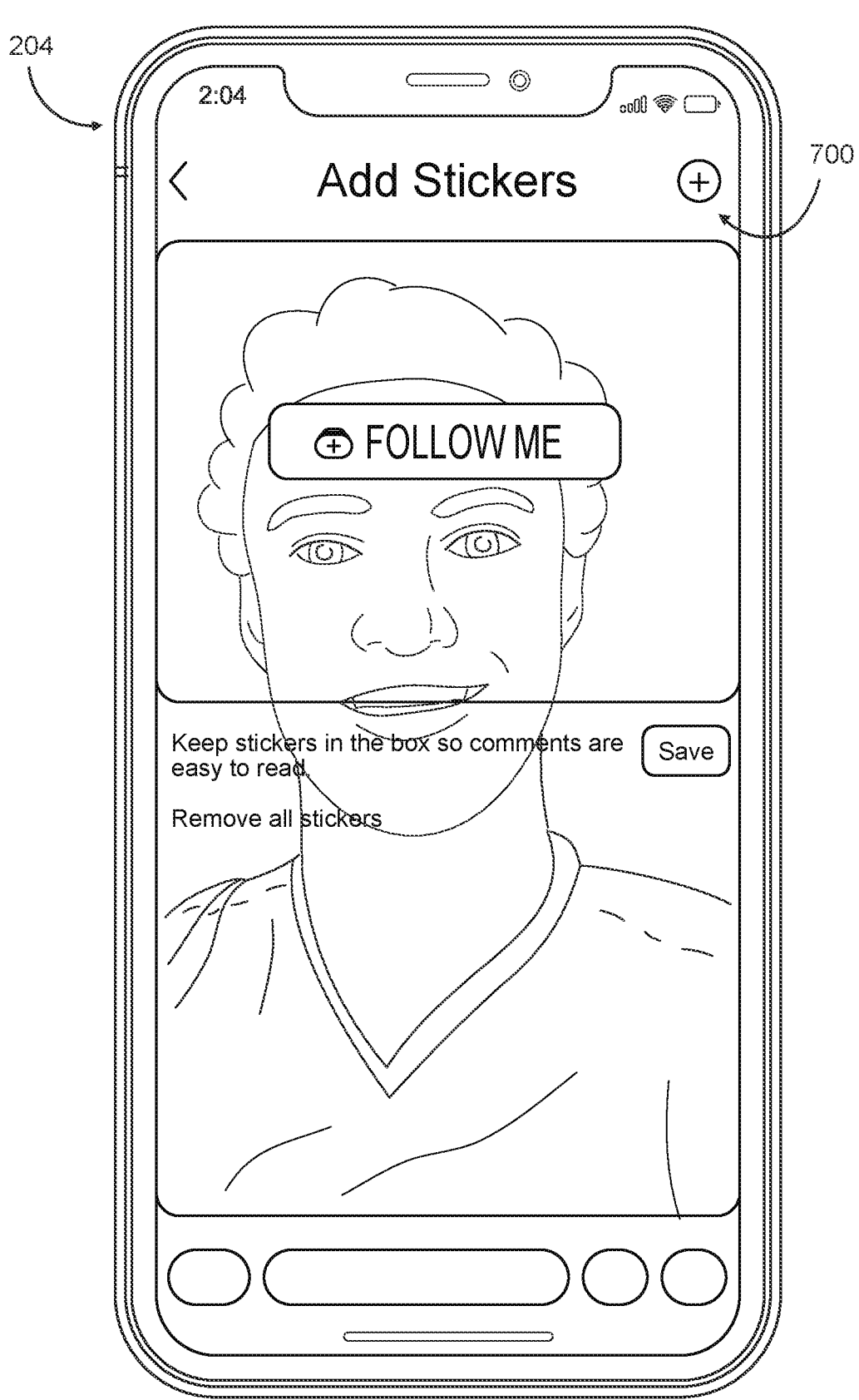
FIG. 8 is an illustration of an exemplary sticker selection screen presented to a broadcaster-user as part of a broadcast creation flow.
Figure 9:
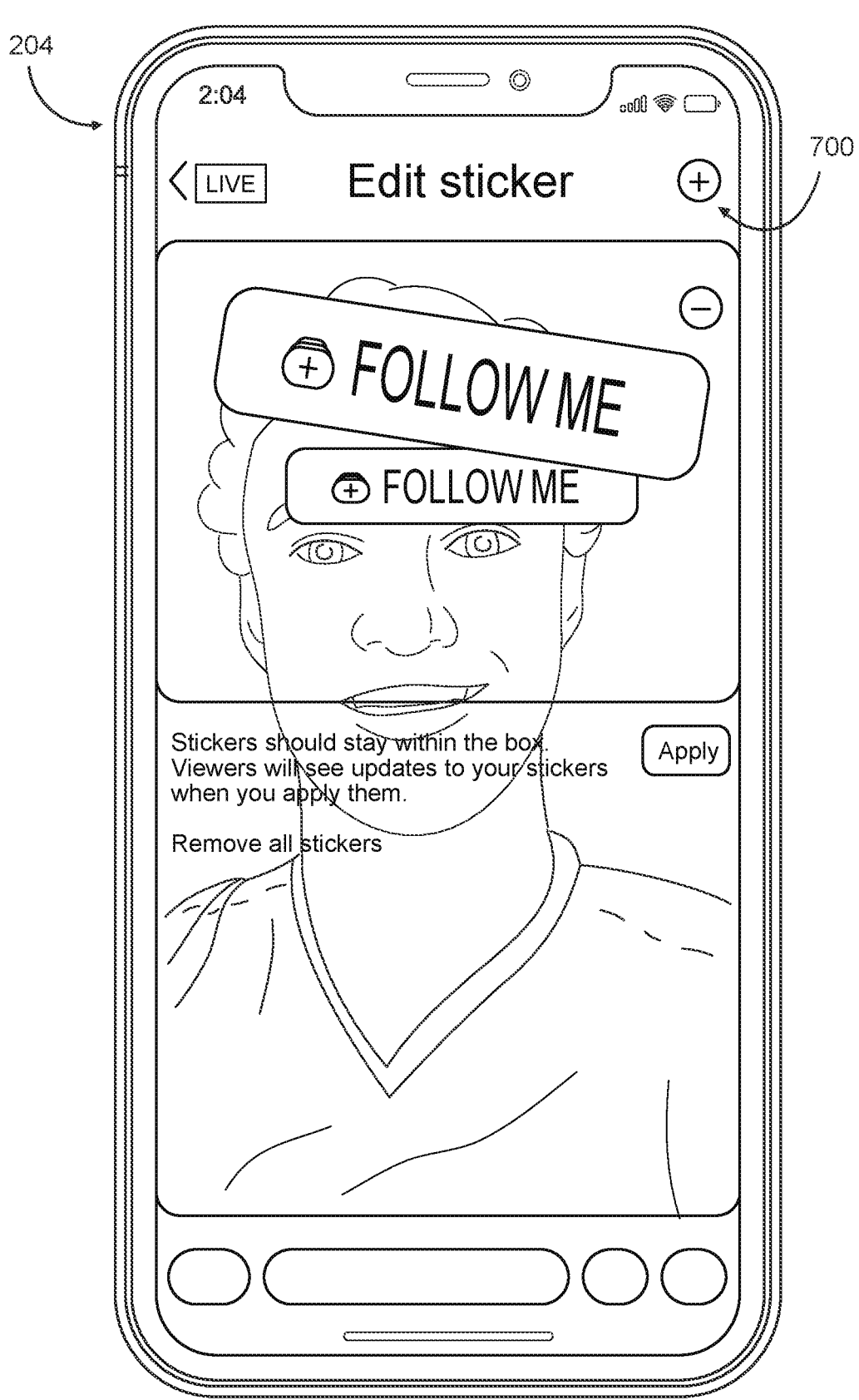
FIG. 9 is an illustration of an exemplary sticker editing screen presented to a broadcaster-user as part of a broadcast creation flow.

In one embodiment, the broadcasting interface may provide broadcaster-user 206 with a digital tray of selectable interactive digital stickers and may enable broadcaster-user 206 to select interactive digital sticker 216 from the digital tray. FIGS. 7-9 provides an exemplary depiction of a broadcasting interface 700, presented to broadcaster-user 206 via a display element of user device 204, with a digital sticker tray 702 (depicted in FIG. 7) that includes a variety of digital stickers that may be selected by broadcaster-user 206 (e.g., a follow sticker 704, a location sticker, a time sticker, a tag sticker, a registration sticker, and a feelings sticker). Each digital sticker may be configured to convey different content and/or to enable different a digital viewer action when transmitted to a viewer device as part of live video stream 214. For example, follow sticker 704 may enable a viewer to follow and/or unfollow broadcaster-user 206, a registration sticker may enable a viewer to register for an event indicated by broadcaster-user 206, a poll sticker may enable a viewer to take a poll, etc.

After selecting interactive digital sticker 216, media module 212 may enable broadcaster-user 206 to select position 218 within an active stream frame currently being presented within the broadcasting interface (i.e., active stream frame 220). Additionally or alternatively, media module 212 may enable broadcaster-user 206 to select a size and/or rotation for interactive digital sticker 216 (e.g., enabling a user placement selection, scaling selection, and/or rotation selection for interactive digital sticker 216 within active stream frame 220, as exemplarily depicted in FIGS. 8-9). In some examples, media module 212 may enable broadcaster-user 206 to place interactive digital sticker 216 anywhere within a viewing area (e.g., a broadcasted area) corresponding to live video stream 214. In some embodiments, media module 212 may enable broadcaster-user 206 to customize interactive digital sticker 216 (e.g., editing a style, color, font, etc.). In one embodiment (e.g., as depicted in FIGS. 8-9), the broadcasting interface may include ghost comments with tips for broadcaster-user 206 (e.g., a placement tip suggesting to not place interactive digital sticker 216 in a position that could interfere with comment visibility/interaction). In some examples, the ghost comments may include a selectable element that enables broadcaster-user 206 to perform an action (e.g., to remove all stickers).

Returning to FIG. 1, at step 120, one or more of the systems described herein may, in response to receiving the selections from the broadcaster-user, render non-interactive image data, corresponding to a non-interactive component of the interactive digital sticker, on top of the active stream frame at the selected position. For example, as illustrated in FIG. 2, media module 212 may, in response to receiving the selections from broadcaster-user 206, render non-interactive image data 222, corresponding to a non-interactive component of interactive digital sticker 216, on top of active stream frame 220 at position 218 selected by broadcaster-user 206.

In some examples, media module 212, at step 120, may operate within a broadcasting device (e.g., server 202 and/or user device 204) that is broadcasting live media stream 214 to one or more viewer endpoint devices. Thus, the non-interactive component of interactive digital sticker 216 may be rendered (e.g., burned into active stream frame 220 by the broadcasting device) prior to active stream frame 220 being transmitted to the one or more viewer endpoint devices. By contrast, in certain embodiments, the interactive component of interactive digital sticker 216 (in the embodiment about to be described in step 130) may not be rendered (e.g., burned into active stream frame 220 by the broadcasting device) prior to active stream frame 220 being transmitted to the one or more viewer endpoint devices.

Returning to FIG. 1, at step 130, one or more of the systems described herein may, as part of transmitting the live video stream to a device of a viewer of the live video stream, (1) transmit, to the viewer's device, the active stream frame with the non-interactive image data and (2) deliver, to the viewer's device, at the active stream frame, interactive digital sticker data corresponding to an interactive component of the interactive digital sticker. For example, as illustrated in FIG. 2, media module 212 may, as part of transmitting live video stream 214 to a viewer user device 224 of a viewer 226 of live video stream 214, (1) transmit, to viewer user device 224, active stream frame 220 with non-interactive image data 222 and (2) deliver, to viewer user device 224, at active stream frame 220, interactive digital sticker data 228 corresponding to an interactive component of interactive digital sticker 216.

Interactive digital sticker data 228 may generally represent any type or form of computer-readable data corresponding to an interactive component of interactive digital sticker 216. Interactive digital sticker data 228 may include a variety of information. In some examples, interactive digital sticker data 228 may include the data needed for a module operating within viewer user device 224 to render the interactive component of interactive digital sticker 216. In other examples, interactive digital sticker data 228 may include (1) a sticker identifier corresponding to interactive digital sticker 216 and (2) data indicating one or more available sticker states for interactive digital sticker 216

(corresponding to one or more viewer categories), and/or viewer category information indicating a category of viewer designated for viewer 226 and/or that may be designated for viewer 226 (as will be described in greater detail later).

In some examples, interactive digital sticker data 228 may include data indicating a position for the interactive component of interactive digital sticker 216 (e.g., a position corresponding to position 218 selected by broadcaster-user 206 at which the non-interactive component of interactive digital sticker 216 is rendered). In some embodiments, this position may be encoded as a percent offset from the top of active stream frame 220. Encoding the position as a percent offset from the top of active stream frame 220 may provide a more stable playback than including exact pixel values, which may break in playback as viewer devices may vary in size and live video stream 214 may be presented on various viewer devices at different resolutions and subject to different cropping decisions (e.g., with varying levels of zoom applied to live video stream 214). The position information may, in some examples, include x, y, width, and height information. In these examples, a module (e.g., operating within viewer user device 224 in connection with a video player that is streaming live media stream 214 within viewer user device 224) may (1) use a position and size of the video player to convert the sticker x, y, width, and height information into a pixel position that corresponds to the position and size of the video player and (2) create and/or update a container for interactive digital sticker 216 at the determined pixel position (e.g., a container that may be removed in response to an instruction based on a determination that broadcaster-user 206 has selected to remove interactive digital sticker 216 from live video stream 214).

Media module 212 may deliver interactive digital sticker data 228 to viewer user device 224 in a variety of ways. In some examples, media module 212 may deliver interactive sticker data 228 within a message (e.g., via a synchronized data channel attached to live video stream 214). In some examples, the message may not include presentation timestamps (e.g., relying on the frame within live media stream 214 at which the message is delivered as the indication of the point in time at which interactive digital sticker 216 is presented). In some examples (as mentioned previously), after being delivered to viewer user device 224, the message may be configured to be parsed by a video player streaming live media stream 214 within viewer user device 224 (e.g., a video player operating as part of social media platform 208).

In some examples in which interactive sticker data 228 includes a sticker identifier and sticker state information (e.g., instead of including the data needed to render the interactive component of interactive digital sticker 216), a module (e.g., operating within viewer user device 224) may be configured to transmit a sticker request back to the broadcasting device (e.g., that includes the sticker identifier and a selection of a particular sticker state). In these examples, media module 212 may, after delivering interactive sticker data 228, receive, from viewer user device 224, the sticker identifier and a sticker request to receive interactive digital sticker 216 in a state (e.g., a version) that corresponds to a particular viewer category associated with viewer 226 (e.g., a category indicated in the interactive sticker data 228 and/or selected from a list of candidate viewer categories indicated in interactive sticker data 228). In response to receiving the sticker identifier and sticker request, media module 212 may transmit the data needed for viewer user device 224 to render the interactive component of interactive digital sticker 216 in the state indicated in the sticker request.

In some examples, media module 212 may (e.g., as part of delivering interactive digital sticker data 228 and/or in response to receiving a sticker identifier and sticker request from viewer user device 224) instruct viewer user device 224 to overlay the interactive component of interactive digital sticker 216 over active stream frame 220 at a position corresponding to position 218. Thus, in these examples, the non-interactive component of interactive digital sticker 216 may be overlayed onto active stream frame 220 by the broadcasting device (e.g., user device 204 and/or server 202) and the interactive component of interactive digital sticker 216 may be overlayed onto active stream frame 220 by viewer user device 224.

The delivering of a message (e.g., with interactive sticker data 228) may be configured to provide the interactive component of interactive digital sticker 216 without disrupting the flow of live video stream 214. In some examples, as intimated above, certain data relevant to rendering the interactive component of interactive digital sticker 216 (e.g., data relating to sticker style type) may intentionally not be included within the message (e.g., to limit the size of the message to a size designed to not disrupt the stability of live video stream 214). In these examples, as previously explained, the message may (instead of including the certain data) include an identifier for interactive digital sticker 216 (e.g., which may be used by viewer user device 224 to query the broadcasting device for the omitted data, as described above).

As mentioned above, the interactive component of interactive digital sticker 216 may come in multiple (e.g., two or more) sticker states (e.g., a follow-state in which the interactive component presents the text "Follow" or a following-state in which the interactive component presents the text "Following.") In these examples, media module 212 may (1) instruct viewer user device 224 to overlay the interactive component in a first sticker state (e.g., a following-state that visually indicates that viewer 226 is following broadcaster-user 206) that corresponds to a first viewer category (e.g., a following category), in response to determining that viewer 226 falls within the first viewer category (e.g., a determination that viewer 226 is following broadcaster-user 206), as depicted in FIG. 10, or (2) instruct viewer user device 224 to overlay the interactive component in a second sticker state (e.g., a follow-state that visually indicates that viewer 226 is not following broadcaster-user 206 and/or that prompts viewer 226 to follow broadcaster-user 206) that corresponds to a second viewer category (e.g., a not-following category), in response to determining that viewer 226 falls within the second viewer category (e.g., a determination that viewer 226 is not following broadcaster-user 206), as depicted in FIG. 11. This sticker state determination may be based on information maintained by server 202 and/or received from viewer user device 224 (e.g., in a request for the sticker state).

In some examples, interactive digital sticker 216 may be configured for viewer interaction after being presented to viewer 226. For example, user selection (e.g., a tap to a touchscreen at a position corresponding to digital sticker 216) may trigger interactive digital sticker 216 to transition from a first state to a second state. Additionally, in examples in which a sticker state corresponds to a viewer category, a user selection of interactive digital sticker 216 may trigger an action (e.g., that changes viewer 226's viewer category). Returning to FIGS. 7-11 as a specific example in which interactive digital sticker 216 represents a follow sticker, user touch to a "follow me" state of interactive digital sticker 216 may trigger a user account of viewer 226 to start following broadcaster-user 206 and may trigger the "following" state of interactive digital sticker 216 (depicted in FIG. 10) to be presented in place of the "follow me" state of interactive digital sticker 216. Thus, the disclosed framework enables different states (e.g., visually distinct versions and/or versions that enable different functionalities) of an interactive sticker to be sent to different viewer devices (e.g., based on user data and/or a categorization of a viewer device) and may also enable a viewer to change viewer category based on input to interactive digital sticker 216.

In some examples (e.g., in which broadcaster-user 206's view of interactive digital sticker 216 is a non-interactive view and the view presented to viewer 226 is an interactive view), a brief image of broadcaster-user 206's view may be presented via viewer user device 224 (e.g., for 250 ms) prior to presenting the version of interactive digital sticker 216 tailored to viewer 226 (e.g., based on a viewer category of viewer 226). In some examples, the disclosed framework may include a delayed burn-in functionality. In these examples, media module 212 may transmit a message with interactive sticker data 228 prior to burning-in non-interactive image data 222 (e.g., prior to rendering non-interactive image data 222 on top of active stream frame 220) to reduce perceptible latency to viewer 226. In certain embodiments, the delayed burn-in may apply to backend rendered stickers but not native rendered stickers.

In certain embodiments, media module 212 may determine that viewer user device 204 and/or an application (e.g., social media application 210), installed on viewer user device 204 that is streaming live video stream 214, does not support interactive digital sticker data. In these embodiments, media module 212 may, in response to the determination, transmit active stream frame 220 with non-interactive image data 222 without delivering interactive digital sticker data 228. By providing both a non-interactive component (e.g., version) of interactive digital sticker 216, the disclosed framework may enable (1) viewer devices that support interactive digital sticker data to present the interactive version of the sticker while at the same time enabling (2) viewer devices that do not support interactive digital sticker data (e.g., inline video players) to present the non-interactive version of the sticker. In some examples, the techniques used to provide interactive digital sticker 216 may differ from the techniques discussed above when live video stream 214 converts to a was-live video stream (e.g., a Video On Demand stream). In one such example, non-interactive data corresponding to interactive digital sticker 216 may be provided for a was-live video stream as part of a metadata track.

The steps described above focus on an embodiment in which an interactive digital sticker, selected by a broadcaster-user, is transmitted as part of a live video stream. However, the features described above may be applied to any type or form of content that may be transmitted as part of a live video stream (e.g., a GIF, an Emoji, an image, a video, etc.).

User interfaces corresponding to the methods and systems described above may be surfaced as part of a variety of navigational flows (e.g., a variety of live stream consumption flows and/or a variety of live stream creation and/or broadcasting flows). In some examples, a navigational flow may include a combination of user interfaces described herein and additional user interfaces not described herein. Each user interface described herein may be surfaced from a variety of entry points. In some examples, the user interfaces described here may be interconnected (e.g., with one interface navigating to another).

In the embodiments depicted in the figures herein (e.g., FIGS. 3-11), the exemplary interfaces have been optimized for a mobile device. Additional or alternative embodiments of these exemplary interfaces may be optimized for other types of computing devices (e.g., a desktop computer, a laptop computer, a wearable device, etc.). In some examples, some or all of the content of these interfaces maybe dynamically modified (e.g., customized for a particular user). For example, posts within a social media feed may be dynamically selected (e.g., based on a variety of inputs, as will be described in greater detail below).

Each of the computer-mediated actions described herein may be performed by a module (e.g., media module 212) that operates within an endpoint device (e.g., user device 204 and/or viewer user device 224) and/or that operates within a backend server (e.g., server 202). In some examples, one or more of the steps may be performed by a broadcasting device (e.g., server 202 and/or user device 204 of broadcaster-user 206). In the examples in which an action involves presenting digital content to a user via an endpoint device and/or receiving user input and/or digital feedback from the user to the endpoint device, the module may perform the action directly, in examples in which the module operates within the endpoint device (e.g., by displaying content via a display element of the endpoint, receiving tapping input to a touchscreen of the endpoint device, and/or receiving input to an auxiliary device communicatively coupled to the endpoint device such a digital mouse and/or a keyboard), and/or indirectly (e.g., in examples in which the module operates within the server). In examples in which a module performs an action indirectly, the module may perform the action in a variety of ways. For example, the module may perform the action by instructing the endpoint device to perform the action, by transmitting content to the endpoint device to be presented by the endpoint device, by providing the endpoint with an application (e.g., social media application 210) that performs the action, by receiving an indication of user input to the endpoint device from the endpoint device, etc. Additionally, in some examples, the module may perform an action operating in a combination of an endpoint device and a backend server.

Each of the digital actions described above may be performed in conjunction with a permissions framework (e.g., a data privacy framework) that enables a user to select how data is selected for the user, how data relating to the user is collected, and how data relating to the user is shared with other users. In some examples, the user may provide permission for an action via a digital permissions process (e.g., via input to a permissions menu and/or page). In some examples, the digital permissions process may be directed to selecting an audience for a user generated post. Additionally or alternatively, the digital permissions process may be directed to permitting information about the user (e.g., a status and/or availability) to be broadcast (e.g., within a profile element and/or contact list). As another example, the digital permissions process may be directed to collecting user history (e.g., to apply to a machine learning system used to select content for the user).

In some of the embodiments described above, the disclosed systems may enable a user to create content (e.g., a social media post for a social media feed and/or a digital message for a private digital messaging thread) via a content-creation interface (e.g., a broadcasting interface). In these embodiments, the content-creation interface may enable a content creation that includes a variety of types of content. Such content may include, without limitation, an image, a video, audio content, a graphic (e.g., a digital sticker such as interactive digital sticker 216), a special effect (e.g., an augmented reality effect), a filter, etc. The content-creation interface may enable a user to provide content in a variety of ways. In some examples, the content-creation interface may enable a user to create (e.g., generate) content via the content-creation interface. For example, the content-creation interface may include a digital canvas that enables a user to digitally draw content and/or may include a capture screen that enables the user to capture visual content via a camera of the user's device and/or audio content via a microphone of the user's device. As another example, the content-creation interface may include a text-input box that enables the user to input text (e.g., via typing input). Additionally or alternatively, the content-creation interface may enable the user to upload content. For example, the content-creation interface may include a drag-and-drop functionality and/or may present content (e.g., images stored in a camera roll of the user's device where permission to access the images has been provided) that may be selected to be included in the user's content creation. In addition to enabling a user to provide (e.g., create and/or upload) content, the content-creation interface may enable a user to modify (e.g., customize) content. For example, the content-creation interface may include a text-customization feature that enables a user to customize the appearance of text (e.g., selecting a size, color, font, and/or position of text). As another example, the content-creation interface may enable a user to select a filter and/or special effect to be applied over content.

In some of the embodiments described above, a module (e.g., media module 212) may select content for a user (e.g., viewer 226). For example, a module may select social media consumption content for the user (e.g., a social media composition for a social media feed and/or a live media stream broadcast for a watch feed) and/or suggested additional users for the user (e.g., a suggested influencer to follow). In these embodiments, the module may select content for the user in a variety of ways. For example, social media consumption content may be selected based on a relationship between the user (e.g., viewer 226) and a creator (e.g., broadcaster-user 206) of the social media consumption content (e.g., in response to determining that the creator is a contact of the user and/or that the user is following the creator), a user history and/or demographic of the user (e.g., indicative of a user interest), user data relating to a contact of the user and/or users with a features in common with the user, etc. In some examples, content may be selected for the user by a machine learning system (e.g., a neural network). In these examples, the machine learning system may select the content in response to receiving a variety of inputs. Such inputs may include inputs relating to the user (e.g., an input derived from a user history, an expressed user preference, etc.), inputs relating to users with a features in common with the user, inputs relating to a demographic and/or a region associated with the user, inputs derived from a social graph, inputs relating to potential content that may be selected for the user (e.g., a topic of such content and/or a popularity of such content), etc.

The present invention (e.g., as described above) discloses an interactive media framework (IMF) system (e.g., for managing the presentation of interactive elements during a broadcast). The IMF system may save the current state of a broadcast on a server when interactive elements are presented (e.g., taking into consideration the interactive elements' start and end time and purging the state of elements that are no longer on screen). The state may include positioning information and/or type, which may allow a client to place a correct element on screen. The server may send intermediate state messages during the broadcast (e.g., even without client-side changes). This may enable viewers who join mid-stream in a broadcast to get the current on-screen elements. In some examples, the state may be sent as a full state restoration in which all the information for all elements currently displayed is included in a message.

EXAMPLE EMBODIMENTS

Example 1: A computer-implemented method may include (1) receiving, from a broadcaster-user of a live video stream, a selection of (i) an interactive digital sticker and (ii) a position for the interactive digital sticker within an active stream frame of the live video stream, (2) in response to receiving the selections from the broadcaster-user, rendering non-interactive image data, corresponding to a non-interactive component of the interactive digital sticker, on top of the active stream frame at the selected position, and (3) as part of transmitting the live video stream to a device of a viewer of the live video stream, (i) transmitting, to the viewer's device, the active stream frame with the non-interactive image data and (ii) delivering to the viewer's device, at the active stream frame, interactive digital sticker data corresponding to an interactive component of the interactive digital sticker.

Example 2: The computer-implemented method of example 1, where delivering the interactive digital sticker data includes instructing the viewer's device to overlay the interactive component of the interactive digital sticker over the active stream frame at a position corresponding to the selected position.

Example 3: The computer-implemented method of example 2, where (1) delivering the interactive digital sticker data to the viewer's device includes determining that the viewer falls within a first viewer category and, in response to determining that the viewer falls within the first viewer category, instructing the viewer's device to overlay the interactive component of the interactive digital sticker in a first sticker state that corresponds to the first viewer category, (2) the method further includes, as part of transmitting the live video stream to a device of an additional viewer of the live video stream, (i) transmitting, to the additional viewer's device, the active stream frame with the non-interactive image data and (ii) delivering to the additional viewer's device, at the active stream frame, interactive digital sticker data corresponding to the interactive component of the interactive digital sticker, and (3) delivering the interactive digital sticker data to the additional viewer's device includes (i) determining that the additional viewer falls within a second viewer category and, (ii) in response to determining that the additional viewer falls within the second viewer category, instructing the additional viewer's device to overlay the interactive component of the interactive digital sticker in a second sticker state that corresponds to the second viewer category.

Example 4: The computer-implemented method of example 3, where the interactive digital sticker includes a follow sticker, the first viewer category includes a following category, designating viewers that are following the broadcaster-user, the first sticker state includes an indication that the broadcaster-user is being followed, the second viewer category includes a not-following category, designating viewers that are not following the broadcaster-user, and the second sticker state includes an invitation to follow the broadcaster-user.

Example 5: The computer-implemented method of examples 1-4, where delivering the interactive digital sticker data includes delivering the interactive digital sticker data within a message via a synchronized data channel attached to the live video stream.

Example 6: The computer-implemented method of examples 1-5, where the interactive digital sticker data includes a sticker identifier corresponding to the interactive digital sticker, data indicating a position for the interactive component of the interactive digital sticker, corresponding to the selected position at which the non-interactive component of the interactive digital sticker is rendered, data indicating a sticker state for the interactive digital sticker corresponding to a viewer category, and/or viewer category information indicating a category of viewer designated for the viewer.

Example 7: The computer-implemented method of example 6, where the position for the interactive component of the interactive digital sticker is encoded as a percent offset from the top of the active stream frame.

Example 8: The computer-implemented method of examples 1-7, where the interactive digital sticker data includes a sticker identifier corresponding to the interactive digital sticker and the method further includes, after delivering the interactive digital sticker data to the viewer's device, receiving, from the viewer's device, the sticker identifier and a request to receive the interactive digital sticker in a state that corresponds to a viewer category associated with the viewer.

Example 9: The computer-implemented method of examples 1-8, further including, as part of transmitting the live video stream to a device of an additional viewer of the live video stream, determining that (1) the additional viewer's device and/or (2) an application, installed on the additional viewer's device that is streaming the live video stream does not support interactive digital sticker data and, in response to the determining, transmitting the active stream frame with the non-interactive image data without delivering the interactive digital sticker data.

Example 10: A system that includes at least one physical processor and physical memory including computer-executable instructions that, when executed by the physical processor, cause the physical processor to (1) receive, from a broadcaster-user of a live video stream, a selection of (i) an interactive digital sticker and (ii) a position for the interactive digital sticker within an active stream frame of the live video stream, (2) in response to receiving the selections from the broadcaster-user, render non-interactive image data, corresponding to a non-interactive component of the interactive digital sticker, on top of the active stream frame at the selected position, and (3) as part of transmitting the live video stream to a device of a viewer of the live video stream, (i) transmit, to the viewer's device, the active stream frame with the non-interactive image data and (ii) deliver to the viewer's device, at the active stream frame, interactive digital sticker data corresponding to an interactive component of the interactive digital sticker.

Example 11: The system of example 10, where delivering the interactive digital sticker data includes instructing the viewer's device to overlay the interactive component of the interactive digital sticker over the active stream frame at a position corresponding to the selected position.

Example 12: The system of example 11, where (1) delivering the interactive digital sticker data to the viewer's device includes determining that the viewer falls within a first viewer category and, in response to determining that the viewer falls within the first viewer category, instructing the viewer's device to overlay the interactive component of the interactive digital sticker in a first sticker state that corresponds to the first viewer category, (2) the computer-executable instructions further cause the physical processor to, as part of transmitting the live video stream to a device of an additional viewer of the live video stream, (i) transmit, to the additional viewer's device, the active stream frame with the non-interactive image data and (ii) deliver to the additional viewer's device, at the active stream frame, interactive digital sticker data corresponding to the interactive component of the interactive digital sticker, and (3) delivering the interactive digital sticker data to the additional viewer's device includes (i) determining that the additional viewer falls within a second viewer category and, (ii) in response to determining that the additional viewer falls within the second viewer category, instructing the additional viewer's device to overlay the interactive component of the interactive digital sticker in a second sticker state that corresponds to the second viewer category.

Example 13: The system of example 12, where the interactive digital sticker includes a follow sticker, the first viewer category includes a following category, designating viewers that are following the broadcaster-user, the first sticker state includes an indication that the broadcaster-user is being followed, the second viewer category includes a not-following category, designating viewers that are not following the broadcaster-user; and the second sticker state includes an invitation to follow the broadcaster-user.

Example 14: The system of examples 10-13, where delivering the interactive digital sticker data includes delivering the interactive digital sticker data within a message via a synchronized data channel attached to the live video stream.

Example 15: The system of examples 10-14, where the interactive digital sticker data includes a sticker identifier corresponding to the interactive digital sticker, data indicating a position for the interactive component of the interactive digital sticker, corresponding to the selected position at which the non-interactive component of the interactive digital sticker is rendered, data indicating a sticker state for the interactive digital sticker corresponding to a viewer category, and/or viewer category information indicating a category of viewer designated for the viewer.

Example 16: The system of example 15, where the position for the interactive component of the interactive digital sticker is encoded as a percent offset from the top of the active stream frame.

Example 17: The system of examples 10-16, where the interactive digital sticker data includes a sticker identifier corresponding to the interactive digital sticker and the computer-executable instructions further cause the physical processor to, after delivering the interactive digital sticker data to the viewer's device, receive, from the viewer's device, the sticker identifier and a request to receive the interactive digital sticker in a state that corresponds to a viewer category associated with the viewer.

Example 18: The system of example 10-17, where the computer-executable instructions further cause the physical processor to, as part of transmitting the live video stream to a device of an additional viewer of the live video stream, determine that (1) the additional viewer's device and/or (2) an application, installed on the additional viewer's device, that is streaming the live video stream, does not support interactive digital sticker data and, in response to the determining, transmit the active stream frame with the non-interactive image data without delivering the interactive digital sticker data.

Example 19: A non-transitory computer-readable medium including one or more computer-readable instructions that, when executed by at least one processor of a computing device, cause the computing device to (1) receive, from a broadcaster-user of a live video stream, a selection of (i) an interactive digital sticker and (ii) a position for the interactive digital sticker within an active stream frame of the live video stream, (2) in response to receiving the selections from the broadcaster-user, render non-interactive image data, corresponding to a non-interactive component of the interactive digital sticker, on top of the active stream frame at the selected position, and (3) as part of transmitting the live video stream to a device of a viewer of the live video stream, (i) transmit, to the viewer's device, the active stream frame with the non-interactive image data and (ii) deliver to the viewer's device, at the active stream frame, interactive digital sticker data corresponding to an interactive component of the interactive digital sticker.

Example 20: The non-transitory computer-readable medium of example 19, where delivering the interactive digital sticker data includes instructing the viewer's device to overlay the interactive component of the interactive digital sticker over the active stream frame at a position corresponding to the selected position.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory devices 230, 232, and 234 in FIG. 2) and at least one physical processor (e.g., physical processors 236, 238, and 240 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, from a broadcaster-user of a live video stream, a selection of (1) an interactive digital sticker and (2) a position for the interactive digital sticker within an active stream frame of the live video stream;
   in response to receiving the selections from the broadcaster-user, rendering non-interactive image data, corresponding to a non-interactive component of the interactive digital sticker, on top of the active stream frame at the selected position; and
   as part of transmitting the live video stream to a device of a viewer of the live video stream, (1) transmitting, to the viewer's device, the active stream frame with the non-interactive image data and (2) delivering to the viewer's device, at the active stream frame, interactive digital sticker data corresponding to an interactive component of the interactive digital sticker, wherein the interactive digital sticker data is delivered within a message via a synchronized data channel that corresponds to the live video stream, such that viewer devices that support interactive digital sticker data present the interactive digital sticker and viewer devices that do not support interactive digital stickers present the non-interactive image data.

2. The computer-implemented method of claim 1, wherein delivering the interactive digital sticker data comprises instructing the viewer's device to overlay the interactive component of the interactive digital sticker over the active stream frame at a position corresponding to the selected position.

3. The computer-implemented method of claim 2, wherein:
   delivering the interactive digital sticker data to the viewer's device comprises:
      determining that the viewer falls within a first viewer category; and
      in response to determining that the viewer falls within the first viewer category, instructing the viewer's device to overlay the interactive component of the interactive digital sticker in a first sticker state that corresponds to the first viewer category;
   the method further comprises, as part of transmitting the live video stream to a device of an additional viewer of the live video stream, (1) transmitting, to the additional viewer's device, the active stream frame with the non-interactive image data and (2) delivering to the additional viewer's device, at the active stream frame, interactive digital sticker data corresponding to the interactive component of the interactive digital sticker; and
   delivering the interactive digital sticker data to the additional viewer's device comprises:
   determining that the additional viewer falls within a second viewer category; and
   in response to determining that the additional viewer falls within the second viewer category, instructing the additional viewer's device to overlay the interactive component of the interactive digital sticker in a second sticker state that corresponds to the second viewer category.

4. The computer-implemented method of claim 3, wherein:
   the interactive digital sticker comprises a follow sticker;
   the first viewer category comprises a following category, designating viewers that are following the broadcaster-user;
   the first sticker state comprises an indication that the broadcaster-user is being followed;
   the second viewer category comprises a not-following category, designating viewers that are not following the broadcaster-user; and
   the second sticker state comprises an invitation to follow the broadcaster-user.

5. The computer-implemented method of claim 1, wherein the interactive digital sticker data comprises at least one of:

a sticker identifier corresponding to the interactive digital sticker;

data indicating a position for the interactive component of the interactive digital sticker, corresponding to the selected position at which the non-interactive component of the interactive digital sticker is rendered;

data indicating a sticker state for the interactive digital sticker corresponding to a viewer category; or viewer category information indicating a category of viewer designated for the viewer.

6. The computer-implemented method of claim 5, wherein the position for the interactive component of the interactive digital sticker is encoded as a percent offset from the top of the active stream frame.

7. The computer-implemented method of claim 1, wherein:

the interactive digital sticker data comprises a sticker identifier corresponding to the interactive digital sticker; and the method further comprises, after delivering the interactive digital sticker data to the viewer's device, receiving, from the viewer's device, the sticker identifier and a request to receive the interactive digital sticker in a state that corresponds to a viewer category associated with the viewer.

8. The computer-implemented method of claim 1, further comprising, as part of transmitting the live video stream to a device of an additional viewer of the live video stream:

determining that at least one of (1) the additional viewer's device or (2) an application, installed on the additional viewer's device that is streaming the live video stream, does not support interactive digital sticker data; and in response to the determining, transmitting the active stream frame with the non-interactive image data without delivering the interactive digital sticker data.

9. A system comprising:

at least one physical processor; and physical memory comprising computer-executable instructions that, when executed by the physical processor, cause the physical processor to:

receive, from a broadcaster-user of a live video stream, a selection of (1) an interactive digital sticker and (2) a position for the interactive digital sticker within an active stream frame of the live video stream;

in response to receiving the selections from the broadcaster-user, render non-interactive image data, corresponding to a non-interactive component of the interactive digital sticker, on top of the active stream frame at the selected position; and as part of transmitting the live video stream to a device of a viewer of the live video stream, (1) transmit, to the viewer's device, the active stream frame with the non-interactive image data and (2) deliver to the viewer's device, at the active stream frame, interactive digital sticker data corresponding to an interactive component of the interactive digital sticker, wherein the interactive digital sticker data is delivered within a message via a synchronized data channel that corresponds to the live video stream, such that viewer devices that support interactive digital sticker data present the interactive digital sticker and viewer devices that do not support interactive digital stickers present the non-interactive image data.

10. The system of claim 9, wherein delivering the interactive digital sticker data comprises instructing the viewer's device to overlay the interactive component of the interactive digital sticker over the active stream frame at a position corresponding to the selected position.

11. The system of claim 10, wherein:

delivering the interactive digital sticker data to the viewer's device comprises:

determining that the viewer falls within a first viewer category; and in response to determining that the viewer falls within the first viewer category, instructing the viewer's device to overlay the interactive component of the interactive digital sticker in a first sticker state that corresponds to the first viewer category;

the computer-executable instructions further cause the physical processor to, as part of transmitting the live video stream to a device of an additional viewer of the live video stream, (1) transmit, to the additional viewer's device, the active stream frame with the non-interactive image data and (2) deliver to the additional viewer's device, at the active stream frame, interactive digital sticker data corresponding to the interactive component of the interactive digital sticker; and delivering the interactive digital sticker data to the additional viewer's device comprises:

determining that the additional viewer falls within a second viewer category; and in response to determining that the additional viewer falls within the second viewer category, instructing the additional viewer's device to overlay the interactive component of the interactive digital sticker in a second sticker state that corresponds to the second viewer category.

12. The system of claim 11, wherein:

the interactive digital sticker comprises a follow sticker;

the first viewer category comprises a following category, designating viewers that are following the broadcaster-user;

the first sticker state comprises an indication that the broadcaster-user is being followed;

the second viewer category comprises a not-following category, designating viewers that are not following the broadcaster-user; and the second sticker state comprises an invitation to follow the broadcaster-user.

13. The system of claim 9, wherein the interactive digital sticker data comprises at least one of:

a sticker identifier corresponding to the interactive digital sticker;

data indicating a position for the interactive component of the interactive digital sticker, corresponding to the selected position at which the non-interactive component of the interactive digital sticker is rendered;

data indicating a sticker state for the interactive digital sticker corresponding to a viewer category; or viewer category information indicating a category of viewer designated for the viewer.

14. The system of claim 13, wherein the position for the interactive component of the interactive digital sticker is encoded as a percent offset from the top of the active stream frame.

15. The system of claim 9, wherein:

the interactive digital sticker data comprises a sticker identifier corresponding to the interactive digital sticker; and the computer-executable instructions further cause the physical processor to, after delivering the interactive digital sticker data to the viewer's device, receive, from the viewer's device, the sticker identifier and a request to receive the interactive digital sticker in a state that corresponds to a viewer category associated with the viewer.

16. The system of claim 9, wherein the computer-executable instructions further cause the physical processor to, as part of transmitting the live video stream to a device of an additional viewer of the live video stream:

determine that at least one of (1) the additional viewer's device or (2) an application, installed on the additional viewer's device, that is streaming the live video stream, does not support interactive digital sticker data; and in response to the determining, transmit the active stream frame with the non-interactive image data without delivering the interactive digital sticker data.

17. A non-transitory computer-readable medium comprising one or more computer-readable instructions that, when executed by at least one processor of a computing device, cause the computing device to:

receive, from a broadcaster-user of a live video stream, a selection of (1) an interactive digital sticker and (2) a position for the interactive digital sticker within an active stream frame of the live video stream;

in response to receiving the selections from the broadcaster-user, render non-interactive image data, corresponding to a non-interactive component of the interactive digital sticker, on top of the active stream frame at the selected position; and as part of transmitting the live video stream to a device of a viewer of the live video stream, (1) transmit, to the viewer's device, the active stream frame with the non-interactive image data and (2) deliver to the viewer's device, at the active stream frame, interactive digital sticker data corresponding to an interactive component of the interactive digital sticker, wherein the interactive digital sticker data is delivered within a message via a synchronized data channel that corresponds to the live video stream, such that viewer devices that support interactive digital sticker data present the interactive digital sticker and viewer devices that do not support interactive digital stickers present the non-interactive image data.

18. The non-transitory computer-readable medium of claim 17, wherein delivering the interactive digital sticker data comprises instructing the viewer's device to overlay the interactive component of the interactive digital sticker over the active stream frame at a position corresponding to the selected position.

\* \* \* \* \*